United States Patent [19]

Arai et al.

[11] Patent Number: 5,229,262
[45] Date of Patent: Jul. 20, 1993

[54] SILVER HALIDE PHOTOGRAPHIC MATERIAL AND METHOD FOR PROCESSING THE SAME

[75] Inventors: Tsutomu Arai; Yuji Mihara; Masaki Okazaki, all of Kanagawa, Japan

[73] Assignee: Fuji Photo Film Co., Ltd., Kanagawa, Japan

[21] Appl. No.: 807,515

[22] Filed: Dec. 16, 1991

[30] Foreign Application Priority Data

Dec. 17, 1990 [JP] Japan .................. 2-411064
Apr. 2, 1991 [JP] Japan .................. 2-094911

[51] Int. Cl.$^5$ .............................. G03C 1/14
[52] U.S. Cl. .................. 430/583; 430/577; 430/513; 430/510; 430/600
[58] Field of Search .......... 430/577, 583, 513, 510, 430/600

[56] References Cited

U.S. PATENT DOCUMENTS 4,312,941 1/1982 Scharf et al. .................. 430/510
4,830,958 5/1989 Okumura et al. ............... 430/510

FOREIGN PATENT DOCUMENTS 2111234 6/1983 United Kingdom ............... 430/577

Primary Examiner—Charles L. Bowers, Jr.
Assistant Examiner—Thoel Chea
Attorney, Agent, or Firm—Sughrue, Mion, Zinn, Macpeak & Seas

[57] ABSTRACT

A silver halide photographic material comprising a support having thereon at least one silver halide photographic emulsion layer containing at least one sensitizing dye represented by formula (I) and at least one compound represented by formula (II).

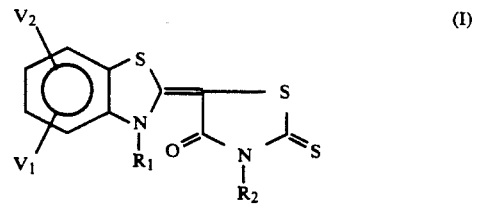

(I)

wherein $R_1$ and $R_2$, which may be the same or different, each represent an alkyl group which may be substituted and at least one of $R_1$ and $R_2$ is an acetylaminoalkyl group or an N-alkylcarbamoylaminoalkyl group; and $V_1$ and $V_2$, which may be the same or different, each represent a hydrogen atom, an alkyl group, an alkoxy group or a trifluoromethyl group.

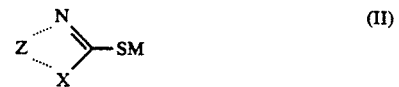

(II)

wherein Z represents a non-metallic atomic group required for forming a heterocyclic ring; M represents a hydrogen atom, an —NH$_4$ group or an alkali metal atom; X represents an >NR group, a sulfur atom or an oxygen atom wherein R represents a hydrogen atom, an alkyl group, an aryl group or an aralkyl group, and a method for processing the silver halide photographic material.

12 Claims, No Drawings

SILVER HALIDE PHOTOGRAPHIC MATERIAL AND METHOD FOR PROCESSING THE SAME

FIELD OF THE INVENTION

This invention relates to a silver halide photographic material which has been spectral sensitized. More particularly, it relates to a silver halide photographic material which has high sensitivity to exposure using an argon laser and in which residual color fogging is reduced.

BACKGROUND OF THE INVENTION

Methods for exposing photographic materials include known image forming methods using a scanner system wherein the original is scanned and a silver halide photographic material is exposed on the basis of the resulting image signals to form a negative or positive image corresponding to the image of the original. Although there are a variety of recording devices utilizing image forming methods employing a scanner system, any dot generator systems using dot generators are used at present.

Glow lamps, xenon lamps, mercury vapor lamps, tungsten lamps and light-emitting diodes have been conventionally used as light sources for recording in these scanner system recording devices.

However, these light sources have practical disadvantages because the output thereof is low and the working life thereof is short. To solve these problems, scanners using, as light sources for the scanner system, coherent laser light sources such as Ne-He lasers; argon lasers, He-Cd lasers and semiconductor lasers have been developed.

Many scanners use an argon laser as the light source thereof because of high output and because the laser beam can be closely stopped down.

Light-sensitive materials having high sensitivity are advantageous in stopping down output to achieve a long working life of the laser bulb, although argon laser provides a high output. Further, a laser beam must be shaped using a slit, etc. to obtain good dots, and light-sensitive materials having high sensitivity are required for coping with laser output which is reduced as a result.

To provide light-sensitive materials for laser beam, a called spectral sensitization technique is generally used wherein a sensitizing dye having absorption at about 488 nm is employed to achieve sensitivity to light having a wavelength of 488 nm, the wavelength of light of a laser beam. The light-sensitive materials, after processing retain a residual color caused by the sensitizing dye, and the commercial value of the finished products is reduced.

An increase in the working efficiency and a speed up of operations in the printing industry has been required recently. In particular, there are requirements to speed-up scanning and to shorten the processing time for the light-sensitive materials.

In order to meet the needs of the printing industry, a speed-up of scanning of the exposure devices (scanner, plotter) and an increase in screen ruling or beams stopped down to obtain an image of higher quality is required. The silver halide photographic materials must have high sensitivity, must have excellent processing stability and must be capable of being rapidly processed. However, when the photographic materials are rapidly processed, residual color caused by sensitizing dyes after processing occurs and this is a problem.

The term "rapid development" or "rapid processing" as used herein refers to processing which takes 15 to 60 seconds for "the leading edge of a film to pass through a developing bath, a transfer zone, a fixing bath, a transfer zone, a rinse bath and a drying zone and emerge from the drying zone in an automatic processor".

Spectral sensitization is an important technique as a means for broadening the spectral sensitivity of silver halide photographic emulsions form the intrinsic sensitivity region of silver halide to a longer wavelength side. The sensitive wavelength region can be controlled into the infrared region almost at will by choosing the structures of the sensitizing dyes used for this purpose. However, various disadvantages still exist, and improvements are required. When the sensitizing dyes are applied to the silver halide emulsion, the objects are (1) that the spectral sensitivity distribution is proper and (2) that high sensitivity can be achieved in the desired spectral sensitivity region, and undesirable phenomena do not occur, for example, (a) fogging does not occur, (b) a change in sensitivity and an increase in fog do not occur during the course of the production of the light-sensitive materials and during storage after production and (c) that the sensitizing dyes are not left behind or decomposed after development into a colored matter to thereby stain the photographic materials.

Methods preventing the formation of stain caused by sensitizing dyes after development are known. Examples of these methods include a method wherein a carboxyalkyl group or a sulfoalkyl group is introduced as described in U.S. Pat. No. 2,519,001 and a method wherein a substituent group having a sulfonamido bond is introduced as described in U.S. Pat. No. 3,282,933. However, it is impossible that all of the above requirements for the sensitizing dyes can be completely met. For example, in the method described in U.S. Pat. No. 2,519,001, there is the possibility that high sensitivity is not obtained or a change in sensitivity occurs during storage after preparation. In the method described in U.S. Pat. No. 3,282,933, it is often impossible to reduce the degree of stain after processing to a desired level. When the spectral sensitivity distribution is longer than 540 nm, safelight fog is deteriorated to a greater extent under safelight conditions where ortho-sensitized photographic materials suitable for an argon laser are processed, and there is difficulty in achieving less safelight fog. Accordingly, a spectral sensitization technique which is highly sensitive to light of an argon laser which forms no or minimal residual color and which allows photographic materials to be handled for a long time under an ortho safelight or a yellow safelight.

SUMMARY OF THE INVENTION

An object of the present invention is to provide a silver halide photographic material which has high sensitivity to an argon laser beam.

Another object of the present invention is to provide a silver halide photographic material which has high sensitivity to an argon laser beam and residual color is hardly formed.

Still another object of the present invention is to provide a silver halide photographic material which has high sensitivity to a argon laser beam and fogging scarcely occurs.

A further object of the present invention is to provide a silver halide photographic material which has high sensitivity to an argon laser beam and provides an image with good quality.

Still a further object of the present invention is to provide a silver halide photographic material where residual color scarcely occur even when the material is rapidly processed after exposure to an argon laser beam and to provide a method for developing the same.

The above-described objects of the present invention are achieved by a silver halide photographic material comprising a support having thereon at least one silver halide emulsion layer containing at least one sensitizing dye represented by formula (I) and at least one compound represented by formula (II);

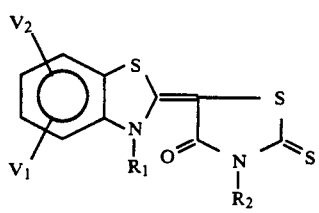
(I)

wherein $R_1$ and $R_2$, which may be the same or different, each represent an alkyl group which may be substituted and at least one of $R_1$ and $R_2$ is an acetylaminoalkyl group or an N-alkylcarbamoylaminoalkyl group; and $V_1$ and $V_2$, which may be the same or different, each represent a hydrogen atom, an alkyl group, an alkoxy group or a trifluoromethyl group;

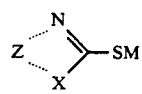
(II)

wherein Z represents a non-metallic atomic group required for forming a heterocyclic ring; M represents a hydrogen atom, a —$NH_4$ group or an alkali metal atom; X represents an >NR group, a sulfur atom or an oxygen atom wherein R represents a hydrogen atom, an alkyl group, an aryl group or an aralkyl group, and a method for processing the silver halide photographic material as described above.

DETAILED DESCRIPTION OF THE INVENTION

The compounds of formula (I) are illustrated in greater detail below.

$R_1$ and $R_2$ each represent an alkyl group (having 4 or less carbon atoms, such as a methyl group, an ethyl group, a 3-propyl group, a 3-butyl group, a 4-butyl group) or a substituted alkyl group [where the alkyl moiety has 4 o less carbon atoms, such as a sulfoalkyl group (e.g., a sulfoethyl group, a 3-sulfopropyl group, a 3-sulfobutyl group, a 4-sulfobutyl group), a carboxyalkyl group (e.g., a carboxymethyl group, a carboxyethyl group, a 3-carboxypropyl group), a hydroxyalkyl group (e.g., a hydroxymethyl group, a hydroxyethyl group), an aralkyl group (e.g., a benzyl group, a phenethyl group, a sulfophenethyl group), an aryloxyalkyl group e.g., a phenoxyethyl group, a phenoxypropyl group, a sulfophenoxypropyl group), an acetylaminoalkyl group containing an alkyl moiety having generally 1 to 18 carbon atoms, preferably 1 to 7 carbon atoms and more preferably 1 to 4 carbon atoms (e.g., 2-acetylaminoethyl group, a 3-acetylaminopropyl group), an alkylsulfonylaminoalkyl group (e.g., a 2-methylsulfonylaminoethyl group, a 3-methylsulfonylaminopropyl group), an N-alkylcarbamoylaminoalkyl group containing an alkyl moiety having generally 1 to 18 carbon atoms, preferably 1 to 7 carbon atoms and more preferably 1 to 4 carbon atoms (e.g., a 2-(N-methylcarbamoyl)aminoethyl group, a 2-(N-ethylcarbamoyl)aminoethyl group, a 3-(N-methylcarbamoyl)aminopropyl group)]. At least one of $R_1$ and $R_2$ is an acetylaminoalkyl group or an N-alkylcarbamoylaminoalkyl group.

$V_1$ and $V_2$ each represent a hydrogen atom, an alkyl group (having 3 or less carbon atoms, such as a methyl group, an ethyl group), an alkoxy group (having 3 or less carbon atoms) such as a methoxy group, an ethoxy group}or trifluoromethyl group.

Specific examples of compounds of formula (I) according to the present invention include the following compounds.

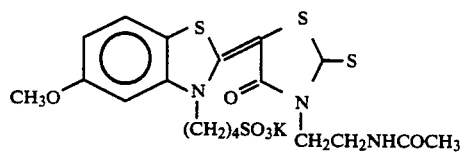
I-1

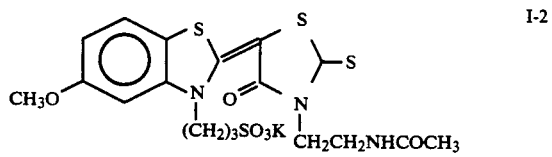
I-2

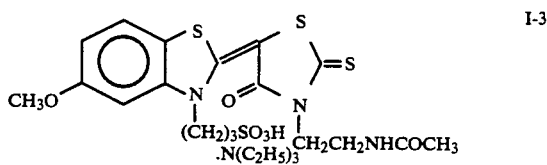
I-3

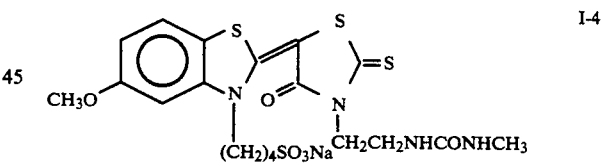
I-4

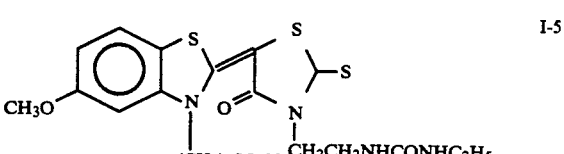
I-5

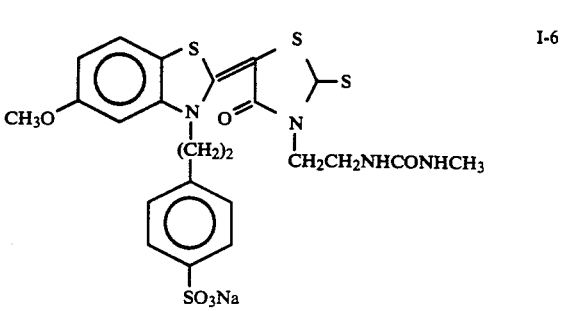
I-6

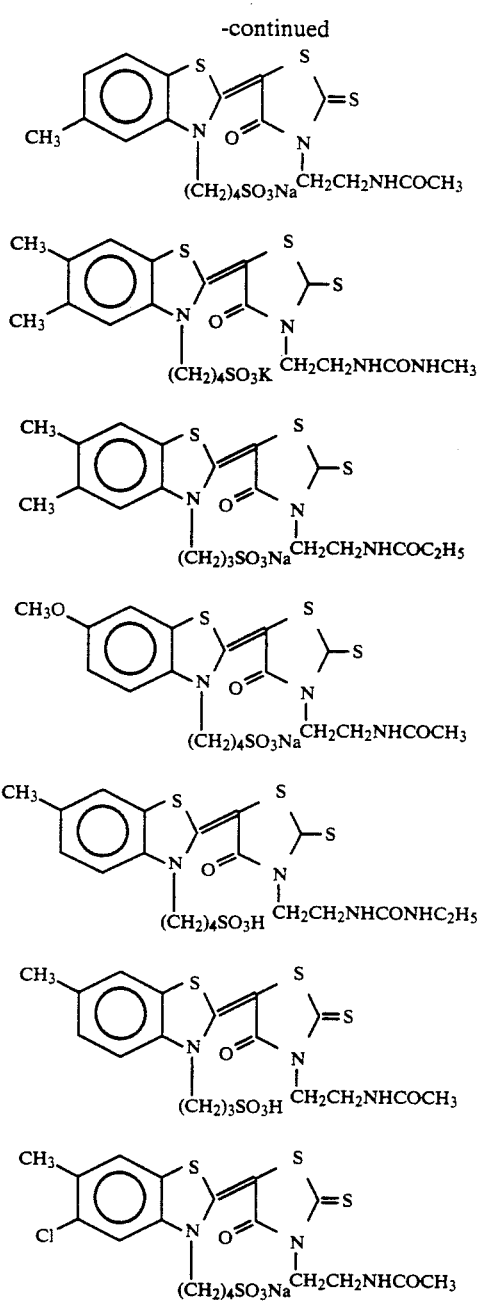

An effective amounts of the compounds of the formula (I) is in the range of generally $1 \times 10^{-5}$ to $1 \times 10^{-2}$ mol and preferably $1 \times 10^{-4}$ to $1 \times 10^{-3}$ mol, per mol of silver.

Compounds of formula (II) are illustrated in greater detail below.

In the formula (II), M represents a hydrogen atom, an —NH$_4$ group or an alkali metal atom; X represents an >NR group, a sulfur atom or an oxygen atom; R represents a hydrogen atom, an alkyl group (having generally 1 to 18 carbon atoms, preferably 1 to 7 carbon atoms and more preferably 1 to 4 carbon atoms) which may be substituted, an aryl group which may be substituted, or an aralkyl group which may be substituted; and Z represents an atomic group required for forming a five-membered heterocyclic ring (e.g., tetrazole, triazole, imidazole, thiadiazole) or a five-membered heterocyclic ring condensed with a benzene ring (e.g., benzimidazole, benzthiazole, benzoxazole) and these heterocyclic rings may be optionally substituted by one or more of an alkyl group, an alkoxy group, a carboxyl group, a sulfo group, a hydroxyl group (having generally 1 to 18 carbon atoms, preferably 1 to 7 carbon atoms and more preferably 1 to 4 carbon atoms), an amino group, a nitro group, a halogen atom, a carbamoyl group, an alkylthio group and a mercapto group. Of them, compounds where Z represents tetrazole, triazole, thiadiazole, benzimidazole or benzthiazole are preferred. Most preferred are tetrazole compounds.

Examples of the above alkyl group include a methyl group, an ethyl group, a propyl group, an isopropyl group, a butyl group, a t-butyl group, a hexyl group, an octyl group, a dodecyl group and an octadecyl group.

Example of the above aryl group include a phenyl group, a 4-methanesulfonamidophenyl group, a 4-methylphenyl group, a 3-methoxyphenyl group, a 4-dimethylaminophenyl group, a 3,4-dichlorophenyl group and a naphthyl group.

Examples of the above aralkyl group include a benzyl group, a 4-methylbenzyl group, a phenethyl group and a 4-methoxybenzyl group.

Specific examples of compounds of formula (II) according to the present invention include the following compounds.

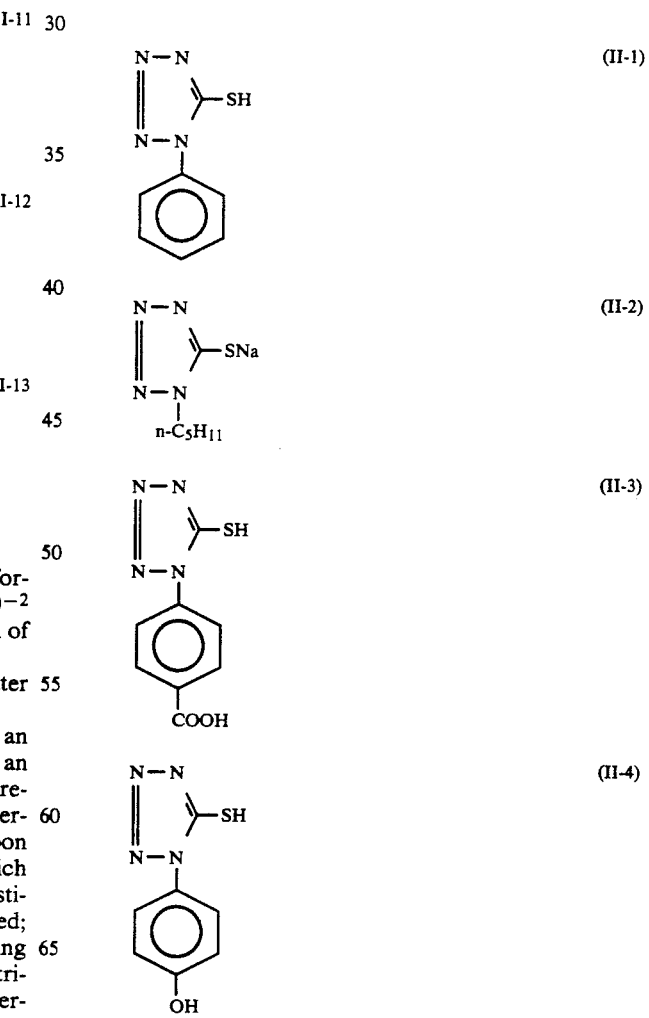

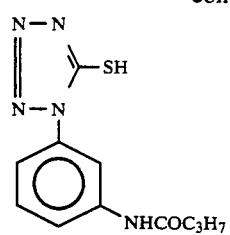 (II-5)
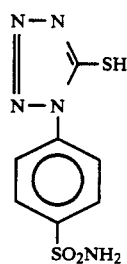 (II-6)
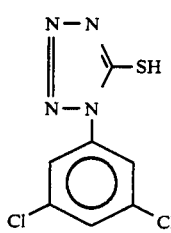 (II-7)
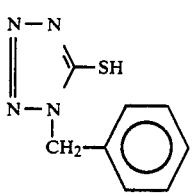 (II-8)
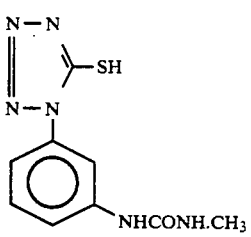 (II-9)
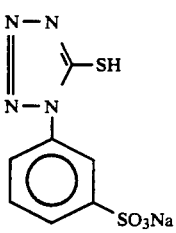 (II-10)
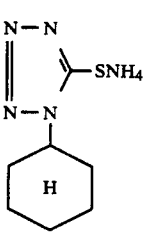 (II-11)
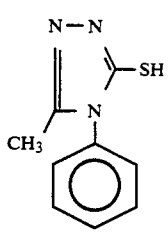 (II-12)
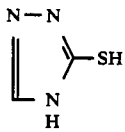 (II-13)
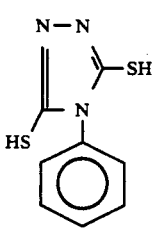 (II-14)
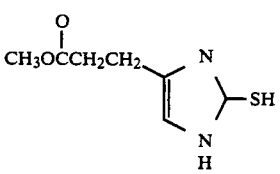 (II-15)
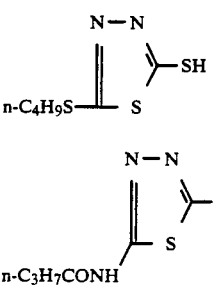 (II-16)
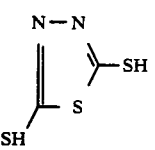 (II-17)
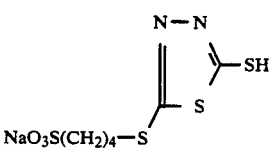 (II-18)
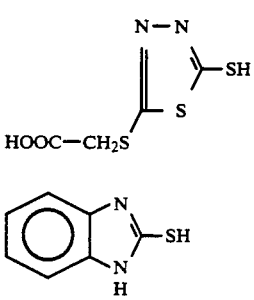 (II-19)
(II-20)
(II-21)

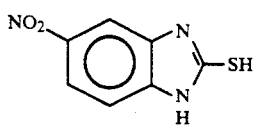 (II-22)

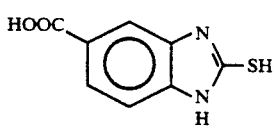 (II-23)

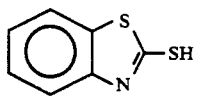 (II-24)

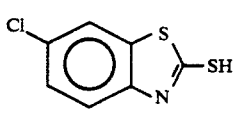 (II-25)

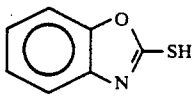 (II-26)

An effective amount of the compounds of the formula (II) is in the range of generally $1 \times 10^{-5}$ to $1 \times 10^{-3}$ mol, preferably $5 \times 10^{-4}$ to $5 \times 10^{-4}$ mol per mol of silver.

The compound of formula (I) can be easily synthesized according to JP-B-38-7828 (the term "JP-B" as used herein means an "examined Japanese Patent publication"), U.S. Pat. No. 2,161,331, German Patent 936,071; F. M. Hamer, *Heterocyclic compounds-Cyanine dyes and related compounds,* Chapter V, pages 116-147, John Wiley & Sons (New York, London) (1964); and D. M. Sturmer, Heterocyclic Compounds-Special Topics in Heterocyclic Chemistry, Chapter VII, Sec. IV, pages 482-515, John Wiley & Sons (New York, London), (1977).

The compound of Formula (II) can be easily synthesized according to U.S. Pat. Nos. 3,266,897, 2,403,927, 3,397,987, 3,615,501, 2,324,123, 2,384,593, 2,496,940, 3,473,924, 3,687,660, 3,137,578, 3,082,088, 3,575,699 and 2,271,229.

It is preferred for the light-sensitive material of the present invention to include a light-insensitive hydrophilic colloid layer with an optical density of at least 0.5 to light of a wavelength of 488 nm on the back side of the support, the back side being the side opposite the side including the emulsion layer containing the compound of formula (I) and the compound of formula (II).

Any conventional antihalation dyes can be used as dyes for use in the light-insensitive hydrophilic colloid layer with an optical density of at least 0.5 to light with a wavelength of 488 nm.

Preferred examples of these dyes include oxonol dyes, hemioxonol dyes, styryl dye, merocyanine dyes, anthraquinone dyes and azo dyes. Further, cyanine dyes, azomethine dyes, triazylmethane dyes and phthalocyanine dyes can be used.

Particularly preferred dyes are cyanine dyes and indoaniline dyes described in JP-A-62-123454 (the term "JP-A" as used herein means an "unexamined published Japanese patent application") and JP-A-62-299838 and dyes of formulas (Ia) to (Id) described in JP-A-61-174540.

These dyes used in the present invention are preferably water-soluble dyes because residual color after processing is reduced.

Dyes with an absorption maximum at 450 nm to 490 nm are preferred.

Examples of dyes suitable for an argon laser output which can be advantageously used in the present invention include the following compounds.

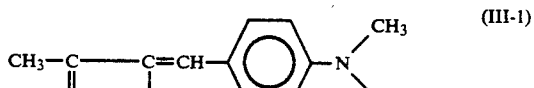 (III-1)

 (III-2)

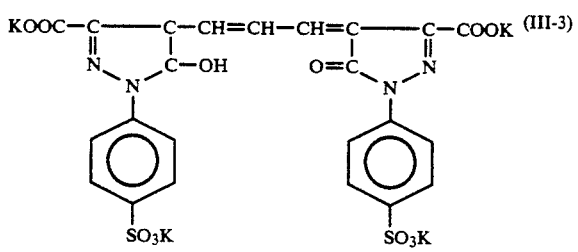 (III-3)

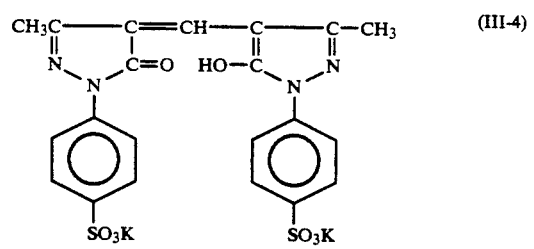 (III-4)

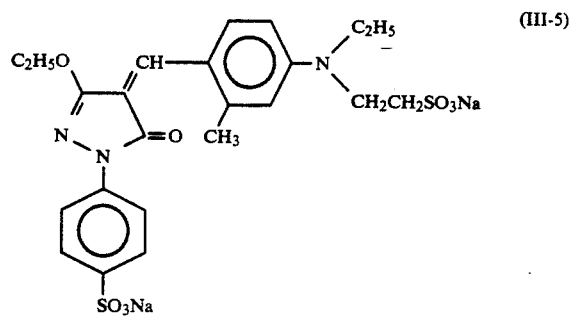 (III-5)

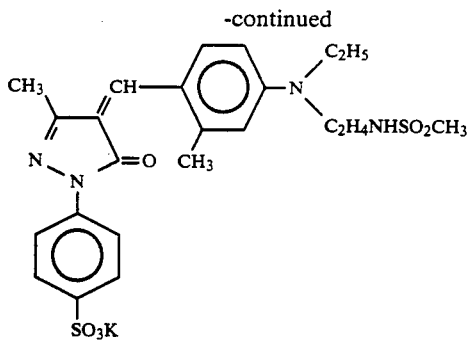

(III-6)

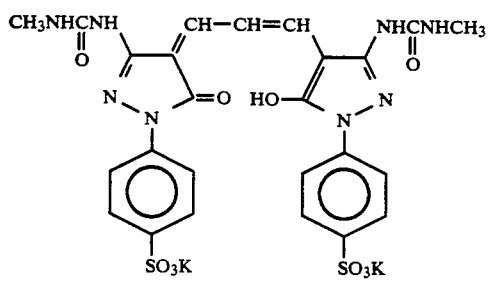

(III-7)

An effective amount of these compounds is in the range of generally $1 \times 10^{-3}$ to 1 g/m$^2$ and preferably $1 \times 10^{-2}$ to 0.5 g/m$^2$.

The amount of hydrophilic binder in the light-insensitive upper layer positioned above the light-sensitive silver halide emulsion layer of the present invention is preferably 1.0 g/m$^2$ or less, particularly preferably 0.5 g/m$^2$ or less.

The ratio by weight of silver to the hydrophilic binder (amount of silver/amount of hydrophilic binder) in the silver halide photographic emulsion layer (emulsion layer) is preferably 2.0 or more, more preferably 2.5 or more.

Rapid processing after exposure, particularly development and fixing, can be ensured by reducing the amount of the hydrophilic binder in the emulsion layer.

The total amount of the hydrophilic binder in the hydrophilic colloid layers including the emulsion layers on the emulsion layer side of the support is preferably 2.2 g/m$^2$ or less, particularly preferably 2.0 g/m$^2$ or less. The total amount of the hydrophilic binder in a transmission type light-sensitive material is preferably 0.5 g/m$^2$ or more and the total amount of the hydrophilic binder in a reflection type light-sensitive material is preferably 0.15 g/m$^2$ or more.

Rapid processing can be achieved by reducing the total amount of the hydrophilic binder in the hydrophilic colloid layers as described above.

Gelatin can be used as the hydrophilic binder present in the above-described hydrophilic colloid layers (emulsion layers, interlayers, protective layers, subbing layers). In addition, hydrophilic binders which can be used include acylated gelatins such as phthalated gelatin and malonated gelatin; cellulose compounds such as hydroxyethyl cellulose and carboxymethyl cellulose; soluble starches such as dextrin; hydrophilic polymers such as polyvinyl alcohol, polyvinyl pyrrolidone, polyacrylamide and polystyrenesulfonic acid; and colloidal silica.

Silver halide grains which can be used in the present invention may be silver halides comprising chloride, bromide and/or iodide, such as silver chloride, silver bromide, silver iodobromide, silver chlorobromide, silver chloroiodide and silver chloroiodobromide. Silver bromide, silver chlorobromide, silver chloride, silver iodobromide and silver chloroiodobromide are particularly preferred. The amount of silver iodide in the silver halide is preferably 0 to 20 mol %, particularly preferably 0 to 10 mol %.

Silver chloride is preferred from the viewpoint of rapid processing.

Silver halide grains which can be advantageously used are grains having a weight ratio of the (100) face/the (111) face of at least 1 and these grains can be prepared by various methods.

The method which is most widely used to prepare such grains is a process wherein an aqueous solution of silver nitrate and an aqueous solution of an alkali metal halide are simultaneously added while the pAg during the formation of the grains is maintained constant at 8.10 or below (controlled double jet process). More preferably, the pAg is kept at 7.80 or below, most preferably at 7.60 or below. Silver halide grains are formed in the two stages of nucleation and growth, and the pAg during nucleation can vary while the range of the pAg during nucleation is as defined above.

These emulsions may comprise coarse grains, fine grains or a mixture thereof. The mean grain size of the silver halide grains is preferably 0.4 μm or less, more preferably 0.35 μm or less, more preferably 0.06 to 0.3 μm.

When silver halide grains with a small grain size are used, the maximum density increases and, at the same time, an effect of processing after exposure, particularly the ability for rapid development and fixing, is enhanced.

The mean grain size of the silver halide grains is a mean value measured, for example, by the projected area method or the number-average method. When the grains have a spherical form or are in the form of nearly a sphere, the diameter of the grain is referred to as the grain size, and when the grains are cubic, the length of an edge is referred to as the grain size. The mean grain size can be represented by a mean value based on the projected areas when the projected area method is used.

Monodisperse emulsions having a coefficient of variation in grain size distribution of 20% or less, preferably 15% or less are preferred.

The grains may have cubic, tetradecahedral, octahedral, amorphous and plate forms, but a cubic form or a plate form is preferable.

Grains which are cubic are preferred but the grains may have an irregular crystal form such as a pebble-like form, a spherical form, a plate form or a tabular from having a grain size of at least 5 times the thickness, so long as the above preferred face index conditions are met.

The crystal structures of the silver halide grains may be uniform throughout the grain, or the interior of the grain and the surface layer thereof may be different, i.e., a layered structure, from each other. The grains may be a conversion type as described in U.K. Patent 635,841 and U.S. Pat. No. 3,622,318. The grains may be the type wherein a latent image is predominantly formed on the surface of the grains and an internal latent image type wherein a latent image is predominantly formed in the interior of the grains.

The emulsions of the present invention contain preferably an iridium ion, a rhodium ion, a ruthenium ion or an osmium ion. The iridium ion, the rhodium ion, the ruthenium ion or the osmium ion can be incorporated in the emulsions by adding a water-soluble iridium compound, a water-soluble rhodium compound, a water-soluble ruthenium compound or a water-soluble osmium compound (e.g., hexachloroiridate(III), hexachloroiridate(IV) rhodium trichloride, ammonium hexachlororhodate, nitrosylruthenium pentachloride, nitrosylosmium pentachloride) in the form of an aqueous solution during preparation of the emulsions.

It is preferred that an iron compound is further used. The iron compound may be added in the form of an aqueous solution in the addition of silver halide for forming grains. The iron compound may be added before or after the formation of the grains, during the formation of the grains, or at any stage before chemical sensitization after the formation of the grains. However, it is particularly preferred for the iron compound to be added during the formation of the grains.

Ammonia, potassium thiocyanate, ammonium thiocyanate, thioether compounds, thione compounds and amine compounds may be used as solvents for silver halide during the formation of the silver halide grains to control the growth of the grains.

In addition to silver halide solvents, compounds which are adsorbed on the surfaces of the grains to control the crystal habit, such as cyanine sensitizing dyes, tetraazaindene compounds or mercapto compounds, may be used during the formation of the grains.

The silver halide photographic emulsions can be chemically sensitized using conventional chemical sensitization methods such as gold sensitization, sulfur sensitization, reduction sensitization or sensitization with thioether compounds.

Various compounds can be present in the light-sensitive materials of the present invention to prevent a reduction in sensitivity or fogging from occurring during the preparation or storage of the light-sensitive materials or during the processing thereof. Many compounds such as heterocyclic compounds, mercury compounds, mercapto compounds and metal salts including nitrobenzimidazole, ammonium chloroplatinate, 4-hydroxy-6-methyl-1,3,3a,7-tetraazaindene and 1-phenyl-5-mercaptotetrazole have long been known. Examples of compounds which can be used include those described in C.E.K. Mees, *The Theory of the Photographic Process* (third edition, 1966), pp. 344–349 (Macmillan & Co.). More specifically, examples of these compounds include thiazolium salts described in U.S. Pat. Nos. 2,131,038 and 2,694,716; azaindenes described in U.S. Pat. Nos. 2,886,437 and 2,444,605; urazol compounds described in U.S. Pat. No. 3,287,135; sulfocatechols described in U.S. Pat. No. 3,236,652; oximes described in U.K. Patent 623,448; mercaptotetrazoles, nitron and nitroindazoles described in U.S. Pat. Nos. 2,403,927, 3,266,897 and 3,397,987; polyvalent metal salts described in U.S. Pat. No. 2,839,405; thiuronium salts described in U.S. Pat. No. 3,220,839; and palladium, platinum and gold salts described in U.S. Pat. Nos. 2,566,236 and 2,597,915.

The total coating weight of silver in the silver halide photographic emulsions of the present invention is generally 4.0 g/m$^2$ or less, preferably 3.5 g/m$^2$ or less, particularly preferably 3.0 g/m$^2$ or less. In the case of transmission type light-sensitive materials, the total coating weight of silver is preferably 1 g/m$^2$ or more. In the case of reflection type light-sensitive materials, the total coating weight of silver is preferably 0.3 g/m$^2$ or more.

The silver halide emulsion layer may comprise a single layer or two or more layers. Two or more emulsions with different grain sizes, sensitivity or the like may be mixed or may be coated as separate layers. The emulsion layers may be coated only on one side of the support or on both sides thereof. When a plurality of emulsion layers are coated, the coating weight of silver is the total amount thereof. Rapid processing can be enhanced to a greater extent by reducing the coating weight of silver.

Rapid processing can be enhanced further when the coating weight of silver and the mean grain size of the silver halide grains are within the ranges specified above.

The layer thickness per layer can be reduced to generally 3 μm or below, preferably 2 μm or below, by reducing the amount of hydrophilic binder in the present invention.

Rapidity of processing can be improved by reducing the layer thickness as described above.

The light-sensitive materials of the present invention may contain various compounds to prevent fogging from occurring during preparation or storage of the light-sensitive materials or during the processing thereof or to stabilize the photographic performance. Examples of suitable compounds, which are known as anti-fogging agents or stabilizers, include azoles such as benzthiazolium salts, nitroindazoles, chlorobenzimidazoles, bromobenzimidazoles, mercaptothiazoles, mercaptobenzthiazoles, mercaptothiadiazoles, aminotriazoles, benzthiazoles and nitrobenztriazoles; mercaptopyrimidines; mercaptotriazines; thio-keto compounds such as oxazolinethione; azaindenes such as triazaindenes, tetraazaindenes (particularly 4-hydroxy-substituted (1,3,3a,7)tetraazaindenes) and pentaazaindenes; and benzenethiosulfonic acid, benzenesulfinic acid and benzenesulfonamide. Particularly, polyhydroxybenzene compounds are preferred because pressure resistance is improved without reduction of sensitivity.

The hydrdphilic colloid layers of the light-sensitive materials of the present invention may contain water-soluble dyes as filter dyes or for various other purposes such as preventing irradiation. Examples of such dyes include oxonol dyes, hemioxonol dyes, styryl dyes, merocyanine dyes, cyanine dyes. Among these, oxonol dyes, hemioxonol dyes and merocyanine dyes are particularly useful.

The photographic emulsion layers of the photographic materials of the present invention may contain polyalkylene oxides or ethers, esters or amine derivatives thereof, thioether compounds, thiomorpholine compounds, quaternary ammonium salt compounds, urethane derivatives, urea derivatives, imidazole derivatives, 3-pyrazolidones and developing agents such as aminophenols to increase sensitivity or contrast or to accelerate development. Among these, 3-pyrazolidones (e.g., 1-phenyl-3-pyrazolidone, 1-phenyl-4-methyl-4-hydroxymethyl-3-pyrazolidone) are preferred and are used in an amount generally of 5 g/m$^2$ or less, preferably 0.01 to 0.2 g/m$^2$.

The photographic emulsions and insensitive hydrophilic colloid layers of the present invention may contain inorganic or organic hardening agents. Examples of suitable hardening agents include active vinyl compounds (e.g., 1,3,5-triacryloylhexahydro-s-triazine, bis(-vinylsulfonyl)methyl ether, N,N-methylenebis[β-(vinylsulfonyl)propioneamido], etc.), active halide compounds (e.g., 2,4-dichloro-6-hydroxy-s-triazine), mucohalogenic acids (e.g., mucochloric acid), N-carbamoylpyridinum salts (e.g., (1-morpholino)carbonyl-3- pyridino) methanesulfonate) and haloamidinium salts (e.g., (1-(1-chloro-1-pyridinomethylene)pyrrolidinium 2-methylenesulfonate). These compounds may be used singly or in combination. Among these, active vinyl compounds described in JP-A-53-41220, JP-A-53-57257, JP-A-59-162546 and JP-A-60-80846 and active halide compounds described in U.S. Pat. No. 3,325,287 are preferred.

The photographic emulsion layers and other hydrophilic colloid layers of the photographic materials of the present invention may contain various surfactants as coating aids or to impart antistatic properties, to improve sliding properties and emulsifying dispersion, to prevent adhesion or to improve photographic characteristics (e.g., development acceleration, high contrast, sensitization).

Examples of suitable surfactants include nonionic surfactants such as saponin (steroid), alkylene oxide derivatives (e.g., polyethylene glycol, polyethylene glycol/polypropylene glycol condensate, polyethylene glycol alkyl ethers or polyethylene glycol alkylaryl ethers, polyethylene glycol esters, polyethylene glycol sorbitan esters, polyalkylene glycol alkylamines or amides, polyethylene oxide adducts of silicone), glycidol derivatives (e.g., alkenylsuccinic acid polyglycerides, alkylphenyl polyglycerides), fatty acid ester of polyhydric alcohols and alkyl esters of saccharose; anionic surfactants having an acid group such as a carboxyl group, a sulfo group, a phospho group, a sulfuric ester group or a phosphoric ester group, such as alkylcarboxylates, alkylsulfonates, alkylbenzenesulfonates, alkylnaphthalenesulfonates, alkylsulfuric esters, alkylphosphoric esters, N-acyl-N-alkyltaurines, sulfosuccinic esters, sulfoalkylpolyoxyethylene alkylphenyl ethers and polyoxyethylene alkylphosphoric esters; amphoteric surfactants such as salts of amino acids, aminoalkylsulfonates, aminoalkylsulfuric or phosphoric esters, alkylbetaines and amine oxides; and cationic surfactants such as alkylamine salts, aliphatic or aromatic quaternary ammonium salts, heterocyclic ammonium salts such as pyridinium salts and imidazolium salts and aliphatic or heterocyclic phosphonium or sulfonium salts.

Fluorine-containing surfactants described in JP-A-60-80849 ar preferred to achieve antistatic properties.

The photographic emulsion layers and other hydrophilic colloid layers of the photographic materials of the present invention may contain matting agents such as silica, magnesium oxide and polymethyl methacrylate to prevent adhesion from occurring.

The photographic materials of the present invention may contain a dispersion of a water-insoluble or sparingly soluble polymer for dimensional stability. For example, polymers of an alkyl (meth)acrylate, an alkoxyalkyl (meth)acrylate and glycidyl (meth)acrylate, can be used alone or in combination, Further, polymers of these monomers with a comonomer such as acrylic acid or methacrylic acid can be used.

Gelatin can be advantageously used as a binder or protective colloid. Other hydrophilic colloids can also be used. Examples of other hydrophilic colloids which can be used include proteins such as gelatin derivatives, graft polymers of gelatin with other high-molecular weight compounds, albumin and casein; cellulose derivatives such as hydroxyethyl cellulose, carboxymethyl cellulose and cellulose sulfate; saccharose derivatives such as sodium alginate and starch derivatives; and synthetic hydrophilic high-molecular weight compounds such as homopolymers, for example, polyvinyl alcohol, polyvinyl alcohol partial acetal, poly-N-vinylpyrrolidone, polyacrylic acid, polymethacrylic acid, polyacrylamide, polyvinylimidazole and polyvinylpyrazole and copolymers thereof.

Examples of gelatins which can be used include lime-processed gelatin, acid-processed gelatin, hydrolyzate-processed gelatin and enzyme-processed gelatin.

The silver halide emulsion layers of the present invention may contain a latex of a polymer such as a polymer of an alkyl acrylate.

Examples of suitable supports for the photographic materials of the present invention include cellulose triacetate, cellulose diacetate, nitrocellulose, polystyrene, polyethylene terephthalate, paper, barayta coated paper and polyolefin-coated paper.

It is preferred to easily obtain dots of good quality that the developing solutions used in the present invention contain dihydroxybenzenes as developing agents, although there is no specific limitation as to the developing agents which can be used for the developing solutions employed in the present invention. A combination of a dihydroxybenzene with 1-phenyl-3-pyrazolidone or a combination of a dihydroxybenzene with a p-aminophenol is often used.

Examples of dihydroxybenzene developing agents which can be used in the present invention include hydroquinone, chlorohydroquinone, bromohydroquinone, isopropylhydroquinone, methylhydroquinone, 2,3-dichlorohydroquinone, 2,5-dichlorohydroquinone, 2,3-dibromohydroquinone and 2,5-dimethylhydroquinone. Among these, hydroquinone is particularly preferred.

Examples of 1-phenyl-3-pyrazolidone or derivatives which can be used as developing agents in the present invention include 1-phenyl-3-pyrazolidone, 1-phenyl-4,4-dimethyl-3-pyrazolidone, 1-phenyl-4-methyl-4-hydroxymethyl-3-pyrazolidone, 1-phenyl-4,4-dihydroxymethyl-3-pyrazolidone, 1-phenyl-5-methyl-3-pyrazolidone, 1-p-aminophenyl-4,4-dimethyl-3-pyrazolidone, 1-p-tolyl-4,4-dimethyl-3-pyrazolidone and 1-p-tolyl-4-methyl-4-hydroxynethyl-3-pyrazolidone.

Examples of p-aminophenol developing agents which can be used in the present invention include N-methyl-p-aminophenol, p-aminophenol, N-($\beta$-hydroxyethyl)-p-aminophenol N-(4-hydroxyphenyl)glycine, 2-methyl-p-aminophenol and p-benzylaminophenol. Among these, N-methyl-p-aminophenol is preferred.

The developing agents are used in an amount of preferably 0.05 to 0.8 mol/l. When a combination of a dihydroxybenzene with a 1-phenyl-3-pyrazolidone or a p-aminophenol is used, the former is used in an amount of preferably 0.05 to 0.5 mol/l, and the latter is used in an amount of preferably 0.06 mol/l or less.

Examples of sulfites which can be used as preservatives include sodium sulfite, potassium sulfite, lithium sulfite, ammonium sulfite, sodium bisulfite, potassium metabisulfite and formaldehyde-sodium bisulfite. Sulfites are used in an amount of preferably 0.3 mol/l or more, particularly preferably 0.4 mol/l or more. The upper limit is preferably 2.5 mol/l, more preferably 1.2 mol/l.

Examples of alkali agents which can be used to adjust pH include pH adjustors and buffering agents such as sodium hydroxide, potassium hydroxide, sodium carbonate, potassium carbonate, sodium tertiary phosphate, potassium tertiary phosphate, sodium silicate and potassium silicate.

Examples of additives which can be used in the present invention in addition to the above-described ingredients include development inhibitor such as boron compounds (e.g., boric acid, borax), sodium bromide, potassium bromide and potassium iodide; organic solvents such as ethylene glycol, diethylene glycol, triethylene glycol, dimethylformamide, methyl cellosolve, hexylene glycol, ethanol and methanol; and anti-fogging agents such as mercapto compounds (e.g., 1-phenyl-5-mercaptotetrazole, sodium 2-mercaptobenzinidazole-5-sulfonate), indazole compounds (e.g., 5-nitroindazole) and benztriazole compounds (e.g., 5-methylbenztriazole). Further, color toning agents, surfactants, deforming agents, hard water softeners and hardening agents may be optionally used. Particularly, amino compounds described in JP-A-56-106244 and imidazole compounds described in JP-B-48-35493 (the term "JP-B" as used herein means an "examined Japanese Patent Publication") are preferred to accelerate development and increase sensitivity.

The developing solutions of the present invention may contain compounds, as silver stain inhibitors, described in JP-A-56-24347, compounds, as uneven development inhibitors, described in JP-A-62-212651 and compounds, as dissolution aids, described in JP-A-61-267759.

The fixing solution of the present invention is an aqueous solution containing a fixing agent and optionally a hardening agent (e.g., a water-soluble aluminum compound), acetic acid and a dibasic acid (e.g., tartaric acid, citric acid or a salt thereof) and has a pH of preferably 8 or less, more preferably 4.0 to 5.5.

Examples of suitable fixing agents include sodium thiosulfate and ammonium thiosulfate. Ammonium thiosulfate is preferred because of fixing rate. The amount of fixing agent used can be varied appropriately, but is generally in the range of about 0.1 to about 5 mol/l.

Water-soluble aluminum salts used mainly as hardening agents in the fixing solution are compounds known as hardening agents for hardening acid fixers. Examples of such compounds include aluminum chloride, aluminum sulfate and potassium alum.

Examples of suitable dibasic acids include tartaric acid and derivatives thereof and citric acid and derivatives thereof. The dibasic acids may be used either alone or in combination. Effective amounts of these compounds are generally 0.005 mol or more per liter of the fixing solution and an amount of 0.01 to 0.03 mol/l is particularly effective.

More specifically, tartaric acid, potassium tartarate, sodium tartarate, potassium sodium tartarate, ammonium tartarate and ammonium potassium tartarate can be effectively used.

Examples of citric acid and derivatives thereof which can be effectively used in the present invention include citric acid, sodium citrate and potassium citrate.

If desired, the fixing solutions may optionally contain preservatives (e.g., sulfites, bisulfites), pH buffering agents (e.g., acetic acid, boric acid), pH adjustors (e.g., ammonia, sulfuric acid), image storage improvers (e.g., potassium iodide) and chelating agents. Since the developing solutions have a high pH, the pH adjustors are used in an amount of preferably 10 to 40 g/l, more preferably 18 to 25 g/l.

The light-sensitive materials of the present invention exhibit excellent performance in rapid processing using an automatic processor where the pre-processing time is 15 to 60 seconds.

In rapid processing which can be used in the present invention, the development and fixing temperature and time are 25° to 50° C. for 25 seconds or less, preferably 30° to 40° C. for 4 to 15 seconds.

After development and fixing, the light sensitive materials of the present invention are subjected to water washing and a stabilization treatment. In the water washing, a two- or three-stage countercurrent rinsing system can be used to thereby save water. When water washing is carried out with a small amount of rinsing water, it is preferred to use a squeeze roller rinsing bath. Further, a part or all of overflow from the rinsing bath and the stabilization bath can be used for the fixing solution as described in JP-A-60-235133. Re-use of overflow is preferred to reduce waste water.

The rinsing water may contain mildew-proofing agents (e.g., compounds described in Horiguchi, *Chemistry of Germicidal Antifungal Agent* and JP-A-62-115154), rinsing accelerators (e.g., sulfites) and chelating agents.

The temperature and time of the rinsing bath and the stabilization bath are 0° to 50° C. for 5 to 30 seconds, preferably 15° to 40° C. for 4 to 20 seconds.

After development, fixing and rinsing, the light-sensitive materials of the present invention are dried through squeeze rollers. The drying is carried out at a temperature of 40° to 80° C. for 4 to 30 seconds.

The overall processing time as used in the description of the present invention refers to total time taken until the leading edge of the film passes through the development bath, a transfer zone, the fixing bath, a transfer zone, the rinsing bath, a transfer zone and the drying zone and leaves the exit of the drying zone in an automatic processor.

Reducers described in Mees, *The Theory of the Photographic Process*, ibid., can be used as reducers of the present invention without particular limitation.

Namely, reduction ingredients such as permanganates, persulfates, ferric salts, cupric salts, ceric salts, red prussiate (potassium ferricyanide) and bichromates can be used either alone or in combination. If desired, reducers containing optionally an inorganic acid such as sulfuric acid and an alcohol, and reducers containing a reduction ingredient such as red prussiate or ethylenediaminetetraacetato ferrate, a solvent for silver halide such as a thiosulfate, a rhodanide, thiourea or a derivative thereof and, optionally, an inorganic acid such as sulfuric acid, can be used.

The reducers used in the present invention may optionally contain compounds having a mercapto group as described in JP-A-52-68419.

The compositions of the reducers and processing conditions (temperature, time) in the reduction process used in the present invention can be appropriately determined by those skilled in the art.

The reducers and reduction methods are described in JP-A-51-140733, JP-A-52-68419, JP-A-53-14901, JP-A-54-119236, JP-A-54-119237, JP-A-55-2245, JP-A-55-2244, JP-A-55-17123, JP-A-55-79444 and JP-A-55-81344.

The present invention is illustrated in greater detail below by reference to the following examples which, however, are not to be construed as limiting the invention in any way. Unless otherwise indicated below, all parts, percents, ratios and the like are by weight.

EXAMPLE 1

| 1. Preparation of Emulsion | |
|---|---|
| Emulsion A | |
| Solution 1 | |
| Water | 1.0 liter |
| Gelatin | 20 g |
| Sodium Chloride | 20 g |
| 1,3-Dimethylimidazolidine-2-thione | 20 mg |
| Sodium Benzenesulfonate | 8 mg |
| Solution 2 | |
| Water | 400 g |
| Silver Nitrate | 100 g |
| Solution 3 | |
| Water | 400 ml |
| Sodium Chloride | 43.5 g |
| Potassium Bromide | 14 g |
| Potassium Hexachloroiridate (III) | 0.018 mg |
| Ammonium Hexachlororhodate (III) | 0.002 mg |

To Solution 1 kept at 38° C. and at a pH of 4.5 were simultaneously added Solution 2 and Solution 3 with stirring over a period of 10 minutes to form nuclear grains having a grain size of 0.16 μm. Subsequently, the Solutions 4 and 5 below were added thereto over a period of 10 minutes. Further, 0.15 g of potassium iodide was added thereto to complete the formation of the grains.

| Solution 4 | |
|---|---|
| Water | 400 ml |
| Silver Nitrate | 100 g |
| Solution 5 | |
| Water | 400 ml |
| Sodium Chloride | 43.5 g |
| Potassium Bromide | 14 g |
| Potassium Ferrocyanide | 6.5 mg |

After rinsing was carried out by the flocculation method, gelatin was added. The pH was adjusted to 5.4 and the pAg was adjusted to 7.5. Subsequently, 8 mg of sodium thiosulfate and 12 mg of chloroauric acid were added, and optimal chemical sensitization was carried out. Thereafter, 200 mg of 2-methyl-4-hydroxy-1,3,3a,7-tetraazaindene, as a stabilizer, and phenoxyethanol, as an antiseptic agent, were added. Finally, an emulsion comprising silver chlorobromide cubic grains having a silver chloride content of 80 mol% and a mean grain size of 0.20 μm was obtained (coefficient of variation: 9%).

To this emulsion was added an ortho-sensitizing dye in an amount of $5 \times 10^{-4}$ mol/mol of Ag as indicated in Table 1 below to achieve ortho-sensitization. Further, 1-phenyl-5-mercaptotetrazole, as an anti-fogging agent, was added in an amount of 50 mg/mol of Ag.

Furthermore, 300 mg of disodium 4,4'-bis(4,6-di-naphthoxy-pyrimidine-2-ylamino)stilbenedisulfonate and 450 mg of 2,5-dimethyl-3-allylbenzthiazole iodide were added to stabilize the emulsion, each amount being per mol of Ag.

Further, 100 mg/m² of hydroquinone, a polyethyl acrylate latex (in an amount of 25% based on the amount of gelatin binder) and 86 mg/m² of 2-bis(vinyl sulfonylacetamido)ethane, as a hardening agent, were added. Gelatin was then added to the emulsion in such an amount as to give coating weights of 1.5 g/m² of gelatin and 3.5 g/m² of silver when the emulsion was coated on a polyester support.

A light-insensitive upper layer comprising 0.10 g/m² of a matting agent (polymethyl methacrylate having an average particle size of 3.4 μm), 1.0 g/m² of gelatin and sodium p-dodecylbenzenesulfonate and a fluorine containing surfactant having the following structural formula (IV-1), as coating aids, and the emulsion layer were simultaneously coated.

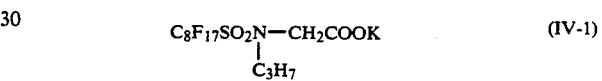

(IV-1)

The support of the sample used in this example had a back layer with the following composition and a back protective layer with the following composition.

| Back layer | |
|---|---|
| Gelatin | 2.0 g/m² |
| Sodium Dodecylbenzenesulfonate | 80 mg/m² |
| Dye (IV-2) | 70 mg/m² |
| Dye (IV-3) | 70 mg/m² |
| Dye (IV-4) | 90 mg/m² |
| 1,3-Divinylsulfone-2-propanol | 60 mg/m² |

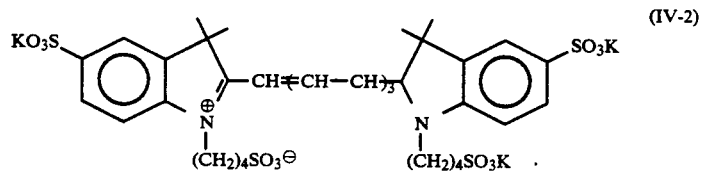

(IV-2)

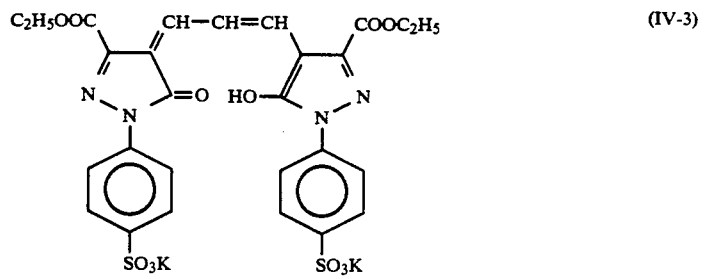

(IV-3)

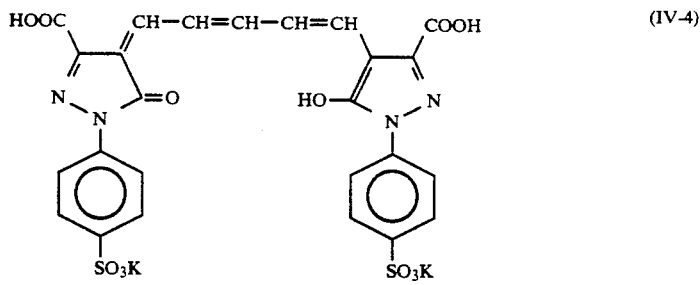

| Back Protective Layer | |
|---|---|
| Gelatin | 0.5 g/m² |
| Polymethyl Methacrylate (particle size: 4.7 μm) | 30 mg/m² |
| Sodium Dodecylbenzenesulfonate | 20 mg/m² |
| Fluorine-containing Surfactant (having the above structural formula IV-1) | 2 mg/m² |
| Silicone oil | 100 mg/m² |

2. Evaluation of Sample

The resulting sample was exposed with a xenon flash light for $1 \times 10^{-5}$ sec through an interference filter having a peak at 488 nm, and subjected to sensitometry under the following temperature and time conditions using an automatic processor FG-710NH manufactured by Fuji Photo Film Co., Ltd.

The following Developing Solution (i) and Fixing Solution (i) were used.

| Development | 38° C. | 20 sec |
|---|---|---|
| Fixing | 37° C. | 13.9 sec |
| Rinsing | 26° C. | 12.9 sec |
| Squeeze | — | 3.4 sec |
| Drying | 55° C. | 11.9 sec |
| Total | — | 62 sec |

| Developing Solution (i) | |
|---|---|
| Hydroquinone | 25.0 g |
| 4-Methyl-4-hydroxymethyl-1-phenyl-3-pyrazolidone | 0.5 g |
| Potassium Sulfite | 90.0 g |
| Disodium Ethylenediaminetetraacetate | 2.0 g |
| Potassium Bromide | 5.0 g |
| 5-Methylbenztriazole | 0.2 g |
| 2-Mercaptobenzimidazole-5-sulfonic Acid | 0.3 g |
| Sodium Carbonate | 20 g |
| Water to make | 1 liter |
| (pH was adjusted to 10.6 by adding sodium hydroxide) | |
| Fixing Solution (i) | |
| Ammonium Thiosulfate | 210 g |
| Sodium sulfite (anhydride) | 20 g |
| Disodium Ethylenediaminetetraacetate | 0.1 g |
| Glacial Acetic Acid | 15 g |
| Water to make | 1 liter |
| (pH was adjusted with ammonia water to 4.8) | |
| Rinsing water | |
| Tap Water | |

(1) Evaluation of Photographic Performance

The logarithm of the exposure amount providing a density of 3.0 is referred to as the sensitivity.

The sensitivity is a relative sensitivity and is shown in Table 1 below.

(2) Evaluation of Residual Color

The light-sensitive material was processed under the above-described conditions except that the rinsing temperature was 5° C. The degree of coloration due to the dyes remaining in the light-sensitive material was determined. A grading scale with ratings of 5, 4, 3, 2, and 1 was used. Ratings of 5 and 4 are estimated as good, and Ratings of 3, 2 and 1 are estimated as bad.

(3) Evaluation of Safety Against Safelight

The sample was irradiated with light of 20 lux by using SLF-1B (safelight for yellow light) manufactured by Fuji Photo Film Co., Ltd. The time taken until fog increased was measured. A larger value means that safety against safelight is better.

The results obtained are shown in Table 1 below.

TABLE 1

| No. | Dye | Sensitivity | Residual Color | Safelight | |
|---|---|---|---|---|---|
| 1 | — | 100 | 5 | — | |
| 2 | A | 269 | 2 | 4' | Comp. Ex. |
| 3 | B | 224 | 3 | 16' | " |
| 4 | C | 324 | 3 | 12' | " |
| 5 | D | 312 | 3 | 4' | " |
| 6 | Compound I-3 | 335 | 5 | 12' | Invention |
| 7 | Compound I-5 | 313 | 4 | 12' | Invention |
| 8 | Compound I-9 | 300 | 5 | 10' | Invention |

Dyes A to D in Table 1 were the following compounds.

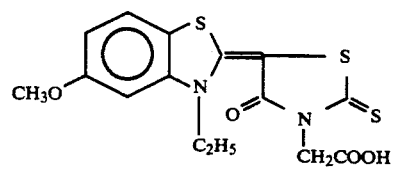

A

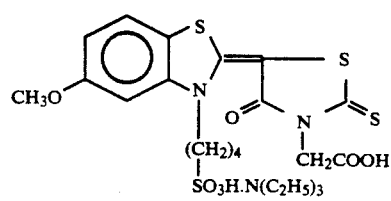

B

-continued

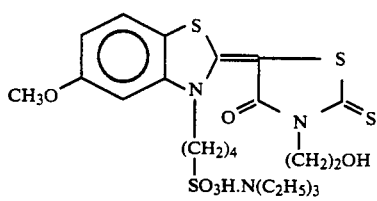

C

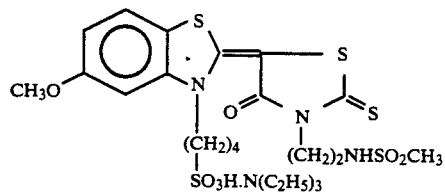

D

As is apparent from the results in Table 1 above the samples of the present invention exhibit high color sensitization, has less residual color and exhibit good safety against safelight.

EXAMPLE 2

1. Preparation of Emulsion

To the emulsion was added an ortho-sensitizing dye in an amount of $5 \times 10^{-4}$ mol/mol of Ag as indicated in Table 2 below for ortho-sensitization. Further, 1-phenyl-5-mercaptotetrazole was added, as an anti-fogging agent, in an amount of 50 mg/mol of Ag was added.

Furthermore, 300 mg of disodium 4,4′-bis-(4,6-dinaphthoxy-pyrimidine-2-ylamino)stilbenedisulfonate, 450 mg of 2,5-di-methyl-3-allyl-benzthiazole iodide and 30 m of Compound II-1 were added to stabilize the emulsion, each amount being per mol of Ag.

Further, 100 mg/m² of hydroquinone, polyethyl acrylate latex (in an amount of 20% based on the amount of gelatin binder), colloidal silica (in an amount of 20% based on the amount of gelatin binder) and 86 mg/m² of 2-bis(vinylsulfonylacetamido)ethane, as a hardening agent, were added. Gelatin was added to the emulsion in an amount to give a coating weight of 1.0 g/m² of gelatin and a coating weight of 3.0 g/m² of silver when the emulsion was coated on a polyester support.

A light-insensitive upper layer comprising 0.10 g/m² of a matting agent (polymethyl methacrylate having an average particle size of 3.4 μm), 0.4 g/m² of gelatin and sodium p-dodecylbenzenesulfonate and a fluorine containing surfactant having the structural formula (IV-1), as coating aids, and the emulsion layer were simultaneously coated.

The support of the sample used in this example had a back layer with the same composition as that in Example 1 and a back protective layer with the same composition as that in Example 1.

2. Evaluation of Sample

The resulting sample was exposed to xenon flash light for $1 \times 10^{-5}$ sec through an interference filter having a peak at 488 nm, and subjected to sensitometry under the following temperature and time conditions using an automatic processor FG-710 NH manufactured by Fuji Photo Film Co., Ltd.

Developing Solution (i) and Fixing Solution (i) described above were used.

| | | |
|---|---|---|
| Development | 38° C. | 14 sec |
| Fixing | 37° C. | 9.7 sec |
| Rinsing | 26° C. | 9 sec |
| Squeeze | — | 2.4 sec |
| Drying | 55° C. | 8.3 sec |
| Total | — | 43.4 sec |

The samples were evaluated in the same manner as in Example 1. The results obtained are shown in Table 2.

TABLE 2

| No. | Dye | Sensitivity | Residual Color | Safelight | |
|---|---|---|---|---|---|
| 1 | — | 100 | 5 | — | |
| 2 | E | 290 | 2 | 5′ | Comp. Ex. |
| 3 | F | 303 | 1 | 8′ | ″ |
| 4 | G | 298 | 3 | 6′ | ″ |
| 5 | E | 286 | 3 | 10′ | ″ |
| 6 | Compound I-3 | 323 | 5 | 14′ | Invention |
| 7 | Compound I-5 | 303 | 4 | 14′ | Invention |
| 8 | Compound I-10 | 300 | 5 | 13′ | Invention |

Dyes E to H in Table 2 were the following compounds.

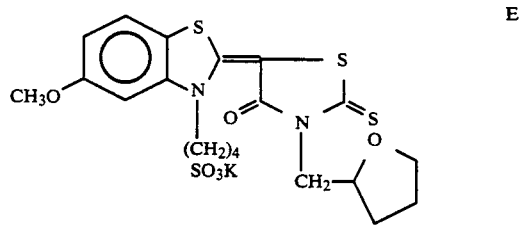

E

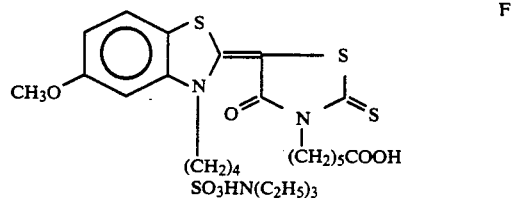

F

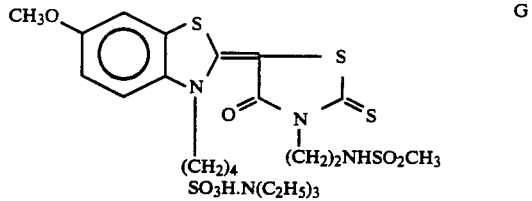

G

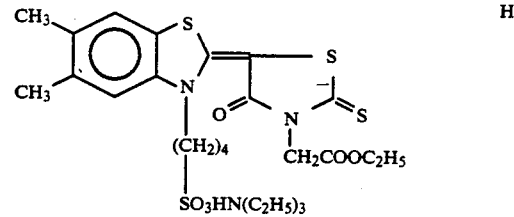

H

As is apparent from the results in Table 2 that the samples of the present invention exhibit high color sensitization, had good safety against safelight and do not cause an increase in residual color even when rapid processing is carried out.

It is clearly seen from the above disclosure that when a sensitizing dye of formula (I) and a compound of formula (II) according to the present invention are present in the emulsion, silver halide photographic materials with excellent sensitivity, residual color and safety against safelight can be obtained.

The present invention provides a silver halide photographic material which has high sensitivity to an argon laser beam and has excellent residual color properties and in which fogging scarcely occurs.

While the invention has been described in detail and with reference to specific embodiments thereof, it will be apparent to one skilled in the art that various changes and modifications can be made therein without departing from the spirit and scope thereof.

What is claimed is:

1. A silver halide photographic material comprising a support having thereon at least one silver halide photographic emulsion layer containing at least one sensitizing dye represented by formula (I) and at least one compound represented by formula (II):

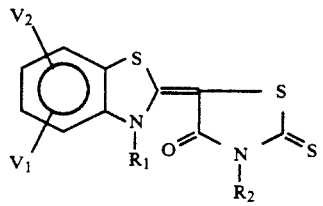
(I)

wherein $R_1$ and $R_2$, which may be the same or different, each represents an alkyl group which may be substituted and at least one of $R_1$ and $R_2$ is an acetylaminoalkyl group or an N-alkylcarbamolyaminoalkyl group; and $V_1$ and $V_2$, which may be the same or different, each represents a hydrogen atom, and alkyl group, an alkoxy group or a trifluoromethyl group:

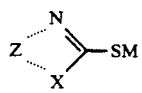
(II)

wherein Z represents a non-metallic atomic group required for forming a heterocyclic ring; M represents a hydrogen atom, an —NH$_4$ group or an alkali metal atom; X represents an >NR group, a sulfur atom or an oxygen atom wherein R represents a hydrogen atom, an alkyl group, an aryl group or an aralkyl group.

2. The silver halide photographic material as in claim 1, wherein said photographic material includes a light-insensitive hydrophilic colloid layer with an optical density of at least 0.5 to light of a wavelength of 488 nm on the side of the support opposite the side on which the emulsion layer is present.

3. The silver halide photographic material as in claim 1, wherein said at least one silver halide photographic emulsion layer contains said at least one sensitizing dye represented by formula (I) in an amount of $1 \times 10^{-5}$ to $1 \times 10^{-2}$ mol per mol of silver and contains said at least one compound represented by formula (II) in an amount of $1 \times 10^{-5}$ to $1 \times 10^{-3}$ mol per mol of silver.

4. The silver halide photographic material as in claim 1, wherein the total amount of the hydrophilic binder in the emulsion and other hydrophilic colloid layers on the side of the support having thereon said at least one silver halide photographic emulsion layer is 2.2 g/m² or less.

5. The silver halide photographic material as in claim 2, wherein the light-insensitive hydrophilic colloid layer contains a water-soluble dye.

6. The silver halide photographic material as in claim 2, wherein the light-insensitive hydrophilic colloid layer contains a dye having an absorption maximum at 450 nm to 490 nm.

7. A method for processing a silver halide photographic material comprising the steps of image-wise exposing a silver halide photographic material and developing said exposed photographic material, wherein said silver halide photographic material comprises a support having thereon at least one silver halide photographic emulsion containing at least one sensitizing dye represented by formula (I) and at least one compound represented by formula (II):

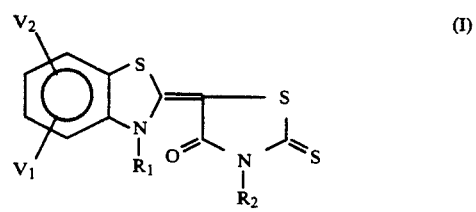
(I)

wherein $R_1$ and $R_2$, which may be the same or different, each represents an alkyl group which may be substituted and at least one of $R_1$ and $R_2$ is an acetylaminoalkyl group or an N-alkylcarbamoylaminoalkyl group; and $V_1$ and $V_2$, which may be the same or different, each represents a hydrogen atom, an alkyl group, an alkoxy group or a trifluoromethyl group:

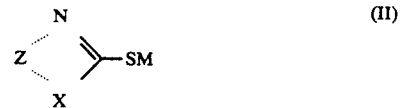
(II)

wherein Z represents a non-metallic atomic group required for forming a heterocyclic ring; M represents hydrogen atom, an —NH$_4$ group or an alkali metal atom; X represents an >NR group, a sulfur atom or an oxygen atom wherein R represents a hydrogen atom, an alkyl group, an aryl group or an aralkyl group.

8. The method for processing a silver halide photographic material as in claim 7, wherein said photographic material includes a light-insensitive hydrophilic colloid layer with an optical density of at least 0.5 to light of a wavelength of 488 nm on the side of the support opposite the side on which the emulsion layer is present.

9. The method for processing a silver halide photographic material as in claim 7, wherein said at least one silver halide photographic emulsion layer contains said at least one sensitizing dye represented by formula (I) in an amount of $1 \times 10^{-5}$ to $1 \times 10^{-2}$ mol per mol of silver and contains said at least one compound represented by formula (II) in an amount of $1 \times 10^{-5}$ to $1 \times 10^{-3}$ mol per mol of silver.

10. The method for processing a silver halide photographic material as in claim 7, wherein the total amount of the hydrophilic binder in the emulsion and other hydrophilic colloid layers on the side of the support having thereon said at least one silver halide photographic emulsion layer is 2.2 g/m² or less.

11. The method for processing a silver halide photographic material as in claim 8, wherein the light-insensitive hydrophilic colloid layer contains a water-soluble dye.

12. The method for processing a silver halide photographic material as in claim 8, wherein the light-insensitive hydrophilic colloid layer contains a dye having an absorption maximum at 450 nm to 490 nm.

* * * * *